United States Patent
Choi et al.

(10) Patent No.: US 9,938,395 B2
(45) Date of Patent: Apr. 10, 2018

(54) TRANSPARENT COMPOSITE MATERIAL COMPOSITION AND METHOD OF PREPARING TRANSPARENT COMPOSITE MATERIAL USING THE SAME

(71) Applicant: HYUNDAI MOTOR COMPANY, Seoul (KR)

(72) Inventors: Young Ho Choi, Seongnam-si (KR); Kyung Mo Yang, Suwon-si (KR); Duck Hyoung Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/208,853

(22) Filed: Jul. 13, 2016

(65) Prior Publication Data

US 2017/0166725 A1    Jun. 15, 2017

(30) Foreign Application Priority Data

Dec. 11, 2015    (KR) ......................... 10-2015-0176884

(51) Int. Cl.
| | | |
|---|---|---|
| *C08F 2/46* | (2006.01) | |
| *C08G 61/04* | (2006.01) | |
| *C08K 5/14* | (2006.01) | |
| *C08F 283/00* | (2006.01) | |
| *C08G 18/50* | (2006.01) | |
| *C08G 18/76* | (2006.01) | |
| *C08J 3/24* | (2006.01) | |
| *C08G 18/72* | (2006.01) | |
| *B60J 1/20* | (2006.01) | |

(52) U.S. Cl.
CPC ............ *C08K 5/14* (2013.01); *C08F 283/006* (2013.01); *C08G 18/5015* (2013.01); *C08G 18/721* (2013.01); *C08G 18/7621* (2013.01); *C08G 18/7671* (2013.01); *C08G 18/7678* (2013.01); *C08J 3/247* (2013.01); *B60J 1/2094* (2013.01); *C08J 2351/08* (2013.01)

(58) Field of Classification Search
CPC .. C08K 5/14; C08G 18/5015; C08G 18/7621; B60J 1/2094; C08J 3/247; C08J 2351/08; C08F 283/006
USPC ............................................ 522/90, 1; 520/1
See application file for complete search history.

(56) References Cited

U.S. PATENT DOCUMENTS

| | | | |
|---|---|---|---|
| 8,128,224 B2 | 3/2012 | Maki et al. | |
| 2006/0051593 A1* | 3/2006 | Peeler .................. | C08F 290/06 428/423.1 |
| 2008/0171197 A1 | 7/2008 | Rukavina | |
| 2011/0172359 A1* | 7/2011 | Panther ............... | C08F 283/006 524/854 |

FOREIGN PATENT DOCUMENTS

| | | | |
|---|---|---|---|
| JP | 01236216 | * | 9/1989 |
| JP | 01254726 | * | 10/1989 |
| JP | H01-282211 A | | 11/1989 |
| JP | 2002-003550 A | | 1/2002 |
| KR | 10-1517177 B1 | | 6/2015 |

OTHER PUBLICATIONS

Yano et al, JP 01236216 Machine Translation, dated Sep. 21, 1989.*
Yano et al, JP 01254726 Machine Translation, dated Oct. 11, 1989.*

* cited by examiner

*Primary Examiner* — Jessica Whiteley
(74) *Attorney, Agent, or Firm* — McDermott Will & Emery LLP

(57) ABSTRACT

A transparent composite material composition, comprises, based on a total amount of the transparent composite material: 90 to 99% by weight of a thermosetting urethane acrylate resin; and 1 to 10% by weight of an organic hydroperoxide initiator. Such a transparent composite material composition exhibits superior properties such as superior transparency, impact resistance, scratch resistance, and weather resistance while realizing weight reduction.

4 Claims, No Drawings

TRANSPARENT COMPOSITE MATERIAL COMPOSITION AND METHOD OF PREPARING TRANSPARENT COMPOSITE MATERIAL USING THE SAME

CROSS-REFERENCE TO RELATED APPLICATION

This application claims under 35 U.S.C. § 119 (a) the benefit of priority to Korean Patent Application No. 10-2015-0176884 filed on Dec. 11, 2015, the entire content of which is incorporated herein by reference.

TECHNICAL FIELD

The present disclosure relates to a transparent composite material composition and a method of preparing a transparent composite material using the same. More particularly, the present disclosure relates to a transparent composite material composition, which exhibits superior properties, such as superior transparency, impact resistance, scratch resistance, and weather resistance while realizing weight reduction, and a method of preparing a transparent composite material using the same.

BACKGROUND

Tempered glass used in automobile sunroofs is heavy, and when impurities are included therein, the tempered glass may be naturally broken. Upon overturning of automobiles, fragments thereof may cause injury. As an alternative thereto, double laminated glass is used in some cases. However, a manufacturing process of the double laminated glass is complex and thus production costs increase. In addition, the double laminated glass still has a limitation due to heavy weight thereof. Polycarbonate (PC) or polymethylmethacrylate (PMMA), as a plastic material, is used in some cases. However, when the PC is used, there are problems such, as insufficient rigidity, a thickness increase, and poor scratch and weather resistance. In addition, when the PMMA is used, impact resistance is insufficient, and thus, use thereof instead of an existing glass material is limited.

Therefore, there is an urgent need for a novel transparent plastic composite material to increase automobile fuel efficiency due to weight reduction by using the same instead of a heavy glass material, provide superior transparency, moldability, etc., and increase surface quality.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art. In exemplary embodiments in the present disclosure, an organic hydroperoxide initiator is added to a thermosetting urethane acrylate resin so as to replace an existing glass material and confirmed that, by using the transparent composite material composition, superior properties such as superior transparency, impact resistance, scratch resistance, weather resistance, etc. are accomplished while realizing weight reduction, an enhanced material for automobile transparent windows is provided, and automobile fuel efficiency, etc. can be enhanced.

In addition, according to exemplary embodiments in the present disclosure, the thermosetting urethane acrylate resin including the organic hydroperoxide initiator can be applied to glass products such as transparent windows of panorama sunroofs, rear windows, delta glass (window between A pillar and rearview mirror of automobiles), and quarter glass (window between rear door and C or D pillar of automobiles).

An aspect of the present disclosure provides a transparent composite material composition having superior properties such as superior transparency, impact resistance, scratch resistance, and weather resistance.

Another aspect of the present disclosure provides a method of preparing a transparent composite material.

Still another aspect of the present disclosure provides a weight-reduced transparent composite material prepared according to the method.

Yet another aspect of the present disclosure provides a molded transparent window product for automobiles made of the weight-reduced transparent composite material.

In accordance with an exemplary embodiment in the present disclosure, a transparent composite material composition, based on a total amount of the transparent composite material composition, includes: 90 to 99% by weight of a thermosetting urethane acrylate resin; and 1 to 10% by weight of an organic hydroperoxide initiator.

In accordance with another exemplary embodiment in the present disclosure, a method of preparing a transparent composite material includes a step of preparing a thermosetting urethane acrylate resin; a step of preparing a transparent composite material composition by adding 1 to 10% by weight of an organic hydroperoxide initiator to 90 to 99% by weight of the thermosetting urethane acrylate resin; and a step of hardening and molding the transparent composite material composition.

Further, a weight-reduced transparent composite material is prepared by the method according to the present disclosure.

In accordance with yet another embodiment in the present disclosure, a molded transparent window product for automobiles made of the weight-reduced transparent composite material The above and other features of the invention are discussed infra.

DETAILED DESCRIPTION

Hereinafter, the present disclosure will be described in more detail with reference to an example.

A transparent composite material composition according to the present disclosure includes 90% to 99% by weight of a thermosetting urethane acrylate resin and 1% to 10% by weight of an organic hydroperoxide initiator.

In particular, the thermosetting urethane acrylate resin of the transparent composite material composition does not include a separate inorganic filler, thereby exhibiting superior transparency. In addition, since the thermosetting urethane acrylate resin includes an organic hydroperoxide initiator, a surface quality decrease due to contraction according to hardening is prevented by controlling a hardening rate and a crosslinking degree, thereby enhancing properties such as moldability.

In the present disclosure, the thermosetting urethane acrylate resin may be prepared by additionally reacting an acrylate compound with a reaction product of polyol and isocyanate. Such a thermosetting urethane acrylate resin may be at least one resin selected from the group consisting of aromatic urethane acrylate, aromatic urethane diacrylate, aromatic urethane multiacrylate, halogen-substituted urethane acrylate, and sulfur (S)-containing urethane acrylate. In a certain embodiment, an aromatic urethane acrylate resin or a halogen-substituted urethane acrylate resin may be used or a fluorene-substituted urethane acrylate resin may be used.

In addition, the thermosetting urethane acrylate resin may be included in an amount of 90 to 99% by weight based on a total amount of the transparent composite material composition. When the content of the thermosetting urethane acrylate resin is less than 90% by weight, transparency may be decreased. When the content is greater than 99% by weight, moldability may decrease.

In accordance with the present disclosure, the organic hydroperoxide initiator remarkably lowers a contraction rate by adjusting a hardening rate and a crosslinking degree of the thermosetting urethane acrylate resin. Such an organic hydroperoxide initiator may be at least one selected from the group consisting of perbutyl peroxide, di-t-butyl peroxide, t-butylcumyl peroxide, dicumyl peroxide, di-(2,4-dichlorobenzoyl)-peroxide, dibenzoyl peroxide, di(2-tert-butylperoxyisopropyl)benzene, t-butyl peroxybenzoate, 1,1-di-(t-butylperoxy)-3,3,5-trimethylcyclohexane, and 2,5-dimethyl-2,5di(t-butylperoxy)-hexane.

In addition, the organic hydroperoxide initiator may be included in an amount of 1 to 10% by weight based on a total amount of the transparent composite material composition. When the content of the organic hydroperoxide initiator is less than 1% by weight, reaction is not smoothly carried out, and accordingly, properties may be reduced and moldability might not be secured. When the content of the organic hydroperoxide initiator is greater than 10% by weight, crosslinking occurs several times, and accordingly, transparency may be decreased and brittleness may occur. The organic hydroperoxide initiator may be used in an amount of 1 to 5% by weight. In a certain embodiment, the organic hydroperoxide initiator may be used in an amount of 2 to 3% by weight.

A method of preparing the transparent composite material according to the present disclosure includes: a step of preparing a thermosetting urethane acrylate resin; a step of preparing a transparent composite material composition by adding 1 to 10% by weight of the organic hydroperoxide initiator to 90 to 99% by weight of the thermosetting urethane acrylate resin; and a step of hardening and molding the transparent composite material composition.

In the step of preparing the thermosetting urethane acrylate resin, an acrylate compound reacts with a reaction product of polyol and isocyanate, and a polymerization inhibitor, a thermosetting agent, etc. may be additionally added thereto. In particular, the polyol may be a fluorinated polytetramethylene glycol having a weight-average molecular weight of 250 to 2,500 g/mol, a polytetramethylene glycol having a weight-average molecular weight of 300 to 3,000 g/mol, or the like. When the weight-average molecular weight of the fluorinated polytetramethylene glycol is less than 250 g/mol, moldability is insufficient. When the weight-average molecular weight of the fluorinated polytetramethylene glycol is greater than 2,500 g/mol, properties such as tensile modulus and tensile strength are decreased. In addition, the weight-average molecular weight of the polytetramethylene glycol is less than 300 g/mol, moldability is decreased. When the weight-average molecular weight of the polytetramethylene glycol is greater than 3,000 g/mol, tensile modulus may be decreased.

In addition, the isocyanate may be 2,4-toluene diisocyanate, 2,6-toluene diisocyanate, naphthalene diisocyanate, 4,4-diphenylmethane diisocyanate, or the like. In addition, the acrylate may be hydroxy methyl methacrylate, hydroxy ethyl methacrylate, or the like. The polymerization inhibitor may be hydroquinone, and the thermosetting agent may be dicyandiamide.

The hardening may be carried out by heating to 45 to 95° C. or through UV irradiation. In particular, in the hardening and molding step, when hardening is carried out at less than 45° C., hardening is not satisfactorily carried out. When the hardening is carried out at greater than 95° C., hardening is rapidly performed, and thus, moldability is decreased. Therefore, the hardening may be carried out within the temperature range.

In addition, a weight-reduced transparent composite material may be prepared according to the method of preparing the transparent composite material.

In addition, a molded transparent window product for automobiles may be made of the weight-reduced transparent composite material.

The transparent composite material composition according to the present disclosure is prepared by adding an organic hydroperoxide initiator to a thermosetting urethane acrylate resin so as to substitute for an existing glass material, and thus, superior properties such as superior transparency, impact resistance, scratch resistance, weather resistance, etc. can be accomplished while realizing weight reduction, an enhanced material for automobile transparent windows can be provided, and automobile fuel efficiency, etc. can be enhanced.

The transparent composite material of the present disclosure may be applied to a transparent window for automobiles. In particular, the transparent composite material can be applied to glass products such as transparent windows of panorama sunroofs, rear windows, delta glass (window between A pillar and rearview mirror of automobiles), and quarter glass (window between rear door and C or D pillar of automobiles).

Hereinafter, the present disclosure will be described in more detail with reference to the following Examples. The scope of the present disclosure is not limited to the following Examples and covers modifications of the technical spirit substantially equivalent thereto.

EXAMPLE 1

Fluorinated polytetramethylene glycol having a weight-average molecular weight of 1,020 g/mol and 2,4-toluene diisocyanate (TDI) were prepared in a weight ratio of 4:1. Subsequently, stirring was performed while adding the fluorinated polytetramethylene glycol to TDI at a reaction temperature of 60° C., thereby causing reaction of fluorene-substituted urethane. Subsequently, 8 parts by weight of a mixture of hydroxy methyl methacrylate and hydroxy ethyl methacrylate mixed in a weight ratio of 1:1 was added to the prepared urethane. Subsequently, 0.5% by weight of hydroquinone as a polymerization inhibitor and 5% by weight of dicyandiamide as a potential thermosetting agent were mixed therewith and stirring was performed, thereby preparing a fluorene-substituted urethane acrylate resin. 2.5% by weight of di(2-tert-butylperoxyisopropyl)benzene as an organic hydroperoxide initiator was added to 97.5% by weight of the fluorene-substituted urethane acrylate resin and crosslinking was performed by heating, thereby preparing a transparent composite material composition. Subsequently, a prepared transparent composite material composition was fed into a cast for a transparent window of a panorama sunroof and hardening was performed by elevating temperature to 80° C. As a result, a transparent window for panorama sunroofs having a thickness of 4 mm was manufactured.

EXAMPLE 2

Polytetramethylene glycol having a weight-average molecular weight of 1,020 g/mol, naphthalene diisocyanate, and 4,4-diphenylmethane diisocyanate were prepared in a weight ratio of 8:1:1. Subsequently, urethane was reacted by adding the polytetramethylene glycol to a mixture of naphthalene diisocyanate and 4,4-diphenylmethane diisocyanate and stirring the same at a reaction temperature of 60° C. Subsequently, 8 parts by weight of a mixture of hydroxy methyl methacrylate and hydroxy ethyl methacrylate mixed in a ratio of 1:1 was added to the prepared urethane and stirring was performed. Subsequently, 0.5% by weight of hydroquinone as a polymerization inhibitor and 5% by weight of dicyandiamide as a potential thermosetting agent were mixed therewith and stirring was performed, thereby preparing an aromatic urethane acrylate resin. 2.5% by weight of di(2-tert-butylperoxyisopropyl)benzene as an organic hydroperoxide initiator was added to the aromatic urethane acrylate resin and crosslinking was performed by heating, thereby preparing a transparent composite material composition. Subsequently, the prepared transparent composite material composition was fed into a cast for a transparent window of a panorama sunroof and hardening was performed by elevating temperature to 80° C. As a result, a transparent window for panorama sunroofs having a thickness of 4 mm was manufactured.

COMPARATIVE EXAMPLE 1

A tempered glass for automobiles thermally treated at high temperature (about 700° C.) was injection-molded into a transparent window for panorama sunroofs having a thickness of 4 mm.

COMPARATIVE EXAMPLE 2

Broadly commercially used poly methyl methacrylate (PMMA) was injection-molded into a transparent window for panorama sunroofs having a thickness of 4 mm.

COMPARATIVE EXAMPLE 3

Broadly commercially used bisphenol A-type polycarbonate was injection-molded into a transparent window for panorama sunroofs having a thickness of 4 mm.

COMPARATIVE EXAMPLE 4

A transparent window for panorama sunroofs was manufactured in the same manner as in Example 1, except that 2.5% by weight of di(2-tert-butylperoxyisopropyl)benzene, as an organic hydroperoxide initiator, was not added.

COMPARATIVE EXAMPLE 5

A transparent window for panorama sunroofs was manufactured in the same manner as in Example 2, except that 2.5% by weight of di(2-tert-butylperoxyisopropyl)benzene, as an organic hydroperoxide initiator, was not added.

EXPERIMENTAL EXAMPLE

Properties such as light transmittance, tensile strength, tensile modulus, impact strength, weather resistance, and scratch resistance of transparent windows for panorama sunroofs according to Examples 1 and 2 and Comparative Examples 1 to 5 were evaluated. Results are summarized in Table 1 below.

TABLE 1

| Classification | | | | Comparative Example 1 (tempered glass) | Comparative Example 2 (PMMA) | Comparative Example 3 (PC) | Comparative Example 4 | Comparative Example 5 |
|---|---|---|---|---|---|---|---|---|
| Items | Test standards | Example 1 | Example 2 | | | | | |
| Specific gravity | ASTM D792 | 1.04 | 1.06 | 2.9 | 1.18 | 1.2 | 1.04 | 1.06 |
| Light transmittance (%) | ASTM D1003 | 86 | 88 | 99 | 92 | 89 | 85 | 88 |
| Tensile strength (MPa) | ASTM D638 | 80 | 82 | 4890 | 67 | 72 | 76 | 81 |
| Tensile modulus (GPa) | ASTM D638 | 3.3 | 3.6 | 74 | 2.6 | 2.3 | 3.3 | 3.6 |
| Notched Izod impact strength @ RT 3.2 mm (J/m) | ASTM D256 | 186 | 169 | — | 144 | 738 | 176 | 157 |
| Steel ball impact strength | ISO 15082 [1] | Supported | Supported | Not supported | Not supported | Supported | Supported | Supported |
| Weather resistance | [2] | 1.0 | 1.1 | Not Detectable | 1.7 | 7.5 | 1.1 | 0.9 |
| Scratch resistance (Δhaze) After 500 Cycles Taber test | ISO 15082 | 4 | 4 | 1 | 28 | 40 | 4 | 3 |
| Linear expansion coefficient ($10^{-6}$ m/m · K) | ISO 11359-2 | 57 | 46 | 2.9 | 70 | 80 | 57 | 49 |

TABLE 1-continued

| Classification | | | | Comparative Example 1 (tempered glass) | Comparative Example 2 (PMMA) | Comparative Example 3 (PC) | Comparative Example 4 | Comparative Example 5 |
|---|---|---|---|---|---|---|---|---|
| Items | Test standards | Example 1 | Example 2 | | | | | |
| Contraction rate (Volumetric shrinkage, %) | — | 2.9 | 3.1 | — | 5.9 | 6.1 | 8.5 | 8.1 |

PC: Polycarbonate (bisphenol A type)
[1] Diameter: 82 mm, a 2,260 g steel ball was dropped from a height of 5 m (Paragraph 9.2)
[2] Xenon arc lamp Weather-o-meter regulated by ISO 105 was used, 2,500 kJ/m$^2$ (340 nm) was irradiated and then ΔE value was measured
Taber test: Abrasion tests were performed 500 times by means of a Taber tester with a 500 g polishing wheel. Subsequently, haze was measured and compared to initial haze (Paragraph 10)

As shown in Table 2, it can be confirmed that, in the cases of Comparative Examples 1 and 2 in which existing transparent window materials for sunroofs are used, they were evaluated as being "not supported" in particularly the steel ball impact strength test. Accordingly, it can be confirmed that a transparent window that is safer upon external impact application or overturning of automobiles is required.

In addition, in the case of Comparative Example 3 in which polycarbonate was used, weather resistance and scratch resistance are remarkably decreased. In order to compensate this, a subsequent process such as coating is required, but there is a burden such as a production cost increase.

In addition, in the cases of Comparative Examples 4 and 5, properties such as tensile strength and tensile modulus are similar to those of Examples 1 and 2, but the contraction rate is high due to exclusion of the organic hydroperoxide initiator. Accordingly, it is difficult to manufacture a transparent window into a desired shape and surface quality is decreased.

On the other hand, it can be confirmed that, in the cases of Examples 1 and 2, light transmittances are about 85% or more, weight reduction of about 50% is accomplished, compared to Comparative Example 1 (tempered glass), superior is properties such as superior tensile strength, tensile modulus, impact strength, weather resistance, linear expansion, and contraction rate are exhibited, and scratch resistance is greatly increased.

Therefore, it was confirmed that the transparent composite material composition prepared according to Examples 1 and 2, which is prepared by adding the organic hydroperoxide initiator to the thermosetting urethane acrylate resin, can be used instead of an existing glass material, can provide superior properties such as superior transparency, impact resistance, scratch resistance, and weather resistance while realizing weight reduction, can be used as an enhanced transparent window material for automobiles, and can enhance fuel efficiency of automobiles, etc.

As apparent from the fore-going, the transparent composite material composition prepared according to the present disclosure, which is prepared by adding the organic hydroperoxide initiator to the thermosetting urethane acrylate resin, can be used instead of an existing glass material, can provide superior properties such as superior transparency, impact resistance, scratch resistance, and weather resistance while realizing weight reduction, can be used as an enhanced transparent window material for automobiles, and can enhance fuel efficiency of automobiles, etc.

The transparent composite material according to the present disclosure may is be provided as a transparent window for automobiles. In particular, the transparent composite material may be applied to glass products such as transparent windows of panorama sunroofs, rear windows, delta glass (window between A pillar and rearview mirror of automobiles), and quarter glass (window between rear door and C or D pillar of automobiles).

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of preparing a transparent composite material, the method comprising:
   preparing a thermosetting urethane acrylate resin;
   preparing a transparent composite material composition, based on a total amount of the transparent composite material composition, by adding 1% to 10% by weight of an organic hydroperoxide initiator to 90% to 99% by weight of the thermosetting urethane acrylate resin; and
   hardening and molding the transparent composite material composition,
   wherein the thermosetting urethane acrylate resin is a halogen-substituted urethane acrylate resin.

2. The method according to claim 1, wherein the organic hydroperoxide initiator is at least one selected from the group consisting of perbutyl peroxide, di-t-butyl peroxide, t-butylcumyl peroxide, dicumyl peroxide, di-(2,4-dichlorobenzoyl)-peroxide, dibenzoyl peroxide, di(2-tert-butylperoxyisopropyl)benzene, t-butyl peroxybenzoate, 1,1-di-(t-butylperoxy)-3,3,5-trimethylcyclohexane, and 2,5-dimethyl-2,5di(t-butylperoxy)-hexane.

3. The method according to claim 1, wherein the hardening is carried out by heating to 45 to 95° C.

4. The method according to claim 1, wherein the hardening is carried out through UV irradiation.

* * * * *